April 9, 1963 E. E. KEIGHTLEY 3,084,866
MIXED AIR HEATING SYSTEMS
Filed Sept. 6, 1960 3 Sheets-Sheet 1
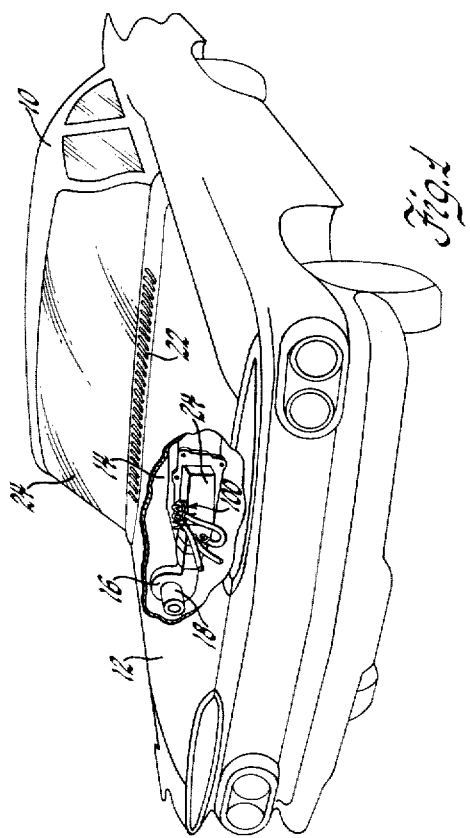
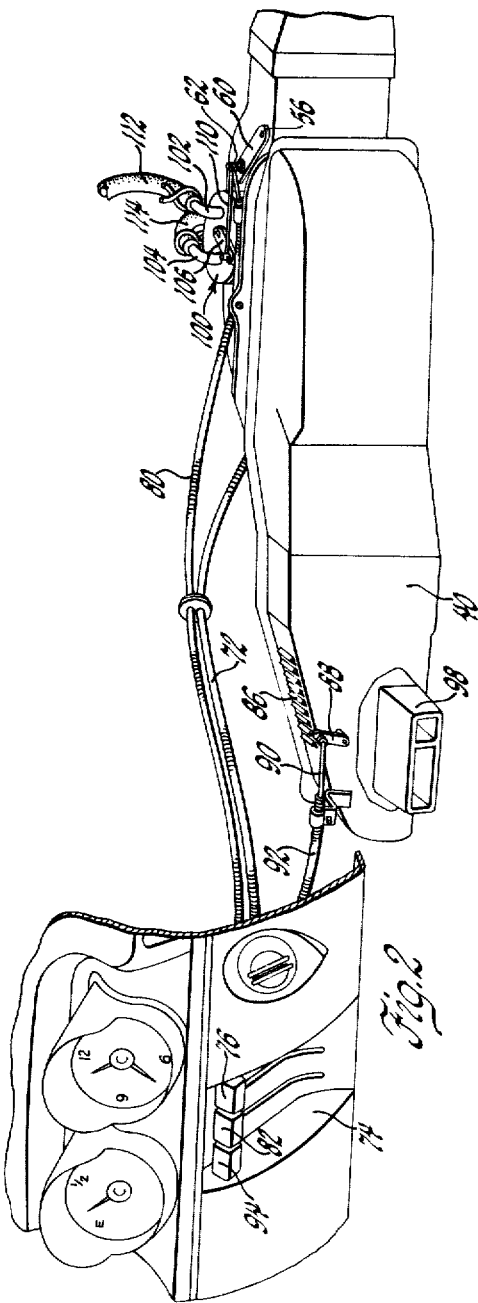
INVENTOR.
Earl E. Keightley
BY
George E. Johnson
ATTORNEY

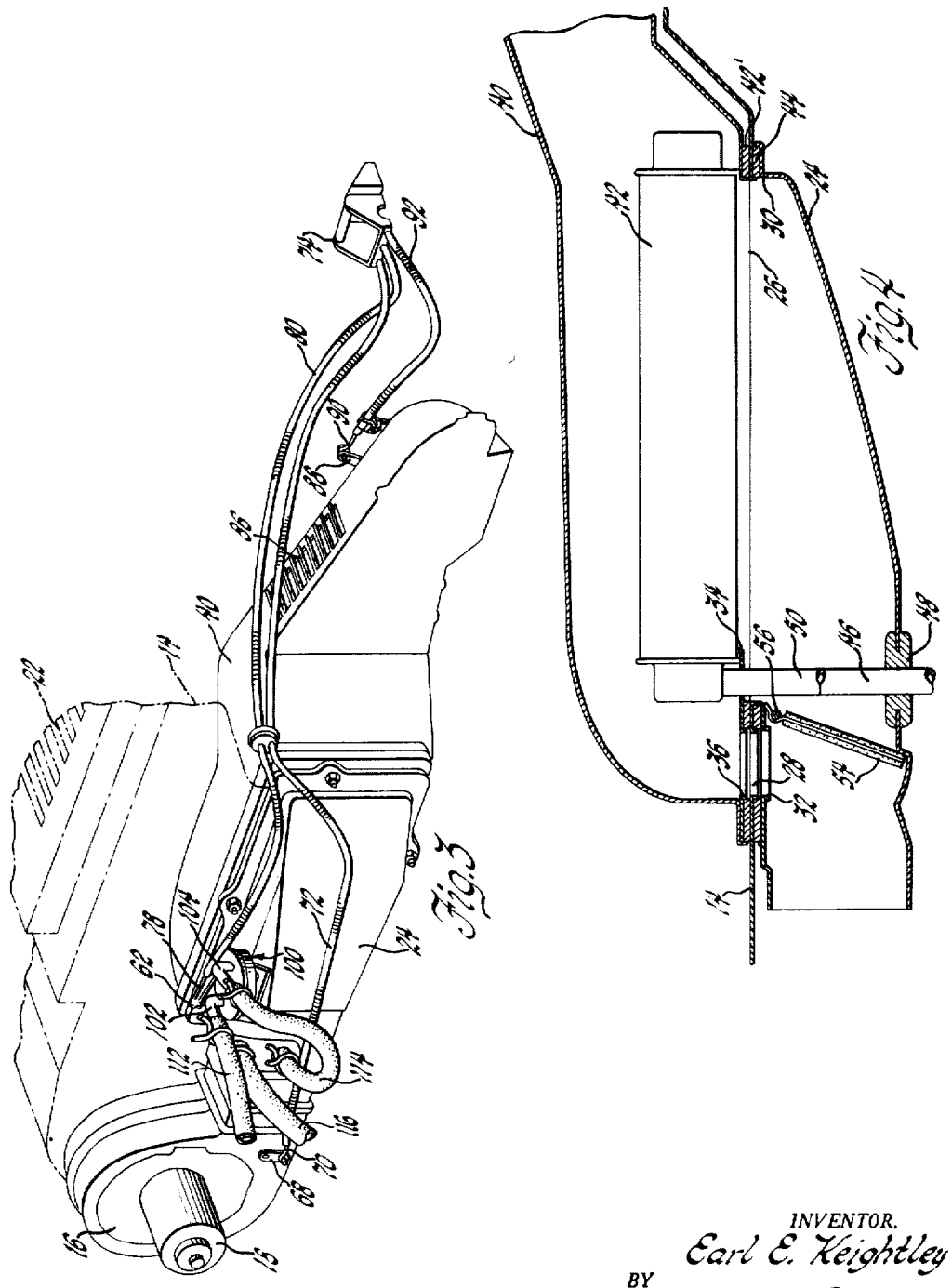

April 9, 1963 E. E. KEIGHTLEY 3,084,866
MIXED AIR HEATING SYSTEMS

Filed Sept. 6, 1960 3 Sheets-Sheet 3

INVENTOR.
Earl E. Keightley
BY
George E. Johnson
ATTORNEY

United States Patent Office 3,084,866
Patented Apr. 9, 1963

3,084,866
MIXED AIR HEATING SYSTEMS
Earl E. Keightley, Birmingham, Mich., assignor to General Motors Corporation, Detroit, Mich., a corporation of Delaware
Filed Sept. 6, 1960, Ser. No. 53,952
1 Claim. (Cl. 237—12.3)

This invention relates to heating systems and more particularly to heating systems for automotive vehicles in which heat is extracted from engine coolant by air flow.

Complex thermosensitive systems have been devised and utilized heretofore in the more or less automatic control of vehicle passenger compartment temperatures. Such systems have proven to be excellent but costly and, under certain conditions, the automatic features did not always satisfy the requirements for passenger comfort. There are advantages in a manually controlled system such as simplicity, ruggedness and reliability. A manual control, however, should be such as to be satisfactorily effective without special reference by the operator to variables such as car speed, water temperature, blower speed or other such factors influencing the system.

An object of the present invention is to provide an improved automobile heating system of simple construction. Another object is to provide a heating system for a vehicle which eliminates the need for a thermosensitive control and assures a simple manual control of the temperature of air admitted to a passenger compartment.

A feature of the present invention is a damper for proportioning the flow of unheated and heated air to a vehicle passenger compartment and which is operatively associated with a valve controlling the flow of engine coolant through a heater core from which the heated air is derived.

These and other important features of the invention will now be described in detail in the specification and then pointed out more particularly in the appended claim.

In the drawings:

FIGURE 1 is a perspective view of an automobile with a portion of the heating system shown installed theron as one embodiment of the present invention;

FIGURE 2 is an enlarged perspective view showing a portion of the instrument panel and an air distributor housing mounted within the passenger compartment of the vehicle of FIGURE 1;

FIGURE 3 is an enlarged perspective view of portions of the heating system as partly shown in FIGURE 1, a fire wall and cowl inlet chamber being shown in dot-and-dash lines;

FIGURE 4 is a sectional view taken along a horizontal plane through the fire wall and duct work shown in FIGURE 3 and looking downwardly;

Figure 5:
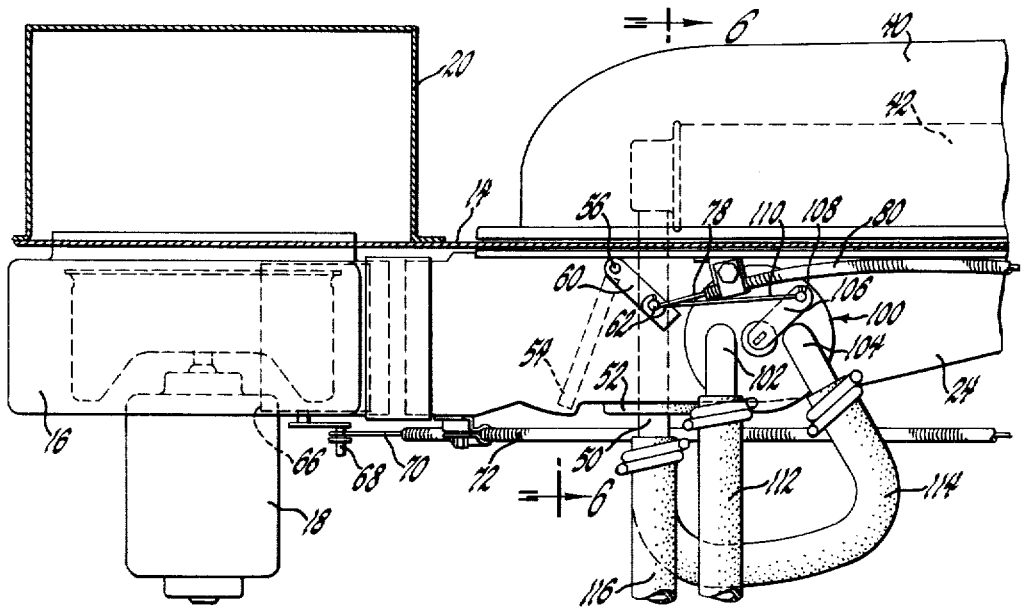
FIGURE 5 is a sectional view through the fire wall and air inlet shroud chamber of FIGURES 1 and 3, a blower and the heater duct work being shown in full and a damper and engine coolant valve control arrangement being depicted.
Figure 6:
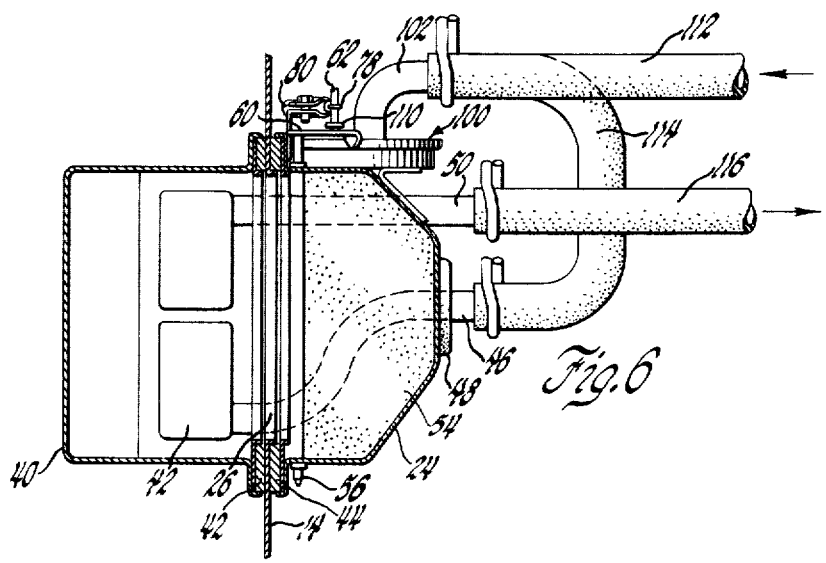
FIGURE 6 is a sectional view looking in the direction of the arrows 6—6 in FIGURE 5.

The heating system as disclosed in the drawings is adapted to be located on an automobile as indicated by major parts shown in FIGURE 1. In that figure, the automobile 10 is provided with an engine compartment hood 12 and between the latter compartment and the passenger compartment is a conventional fire wall 14. On this fire wall is mounted a blower 16 adapted to be operated by an electric motor 18. The blower is positioned to receive air from a side chamber 20 of the vehicle body. This chamber receives outside air from a louvered opening 22 (FIGURE 3) located immediately forward of the windshield 24. Such outside air admission forms no part of the present invention but is disclosed in the United States patent to J. D. Leslie, R. M. Fox and E. J. Premo, No. 2,852,997, granted September 23, 1958. In such a system the chamber 20 serves to remove any moisture entrained in the admitted air. On the front side of the fire wall 14 and within the engine compartment is located a housing 24 which is adapted to receive air discharged from the blower 16. The fire wall 14 has a large main aperture 26 and a small by-pass aperture 28. These apertures are in registry with corresponding openings 30 and 32 respectively, formed in the housing 24. They are also in registry with a large opening 34 and a small opening 36, respectively, formed in the forward side of an air distributor manifold 40 constituting a common discharge means and mixing chamber for heated and/or unheated air and located in the passenger compartment. The manifold 40 encloses a heat exchange core or heat exchanger 42 which is positioned to receive air from the opening 26 in the fire wall 14. The manifold 40 is of sufficient size that air may also pass from the blower and through the opening 28 of the fire wall and freely around one end of the core in a passage best shown in FIGURE 4. In the fire wall mounting of the duct work which includes the housing 24 and the manifold 40, suitable spacing means 42' and 44 are employed. These also serve to insure sealing of the duct work. A conduit 46 passes through a grommet 48 inserted in the wall of the housing 24 and is connected to one leg of the heater core 42. The circulatory passages for engine coolant in the heater core is generally U-shaped with the other leg of the core being connected by a conduit 50, which extends forwardly and through a grommet 52 inserted in an upper portion of the forward wall of the housing 24.

Within the housing 24 is located a damper 54. It is mounted to swing on a vertical shaft 56 to serve as a single damper control of the air flow to the heater core and through the by-pass arrangement comprising the parts having the by-pass apertures 32, 28 and 36. The shaft 56 extends upwardly to the exterior of the housing 24 to bear a crank arm 60. Near the free end of the latter is a pin 62.

The air discharge end of the blower 16 is provided with a damper 66 (FIGURE 5) and this damper is arranged to be operated by a crank 68 and is capable of closing off all air from the blower 16. The crank 68 is adapted to be actuated by a Bowden wire 70 and the latter is guided in a conduit 72 to a control unit 74 mounted on the instrument panel. This control unit bears three levers one lever 76 being adapted to operate the blower discharge damper 66. The crankpin 62 of the proportioning damper 54 is pivotally connected to a Bowden wire 78 which is guided by a conduit 80 to a second lever 82 of the control unit 74.

The manifold 40 is provided with a louvered defroster opening 86 of rectangular configuration. This opening is controlled by a damper mounted inside the manifold and not shown in the drawings. This damper is actuated by a lever 88 connected by means of a Bowden wire 90 and conduit 92 to a third lever 94 of the control unit 74. Further details regarding the windshield defroster aspects are not recited herein as they form no part of the present invention. It suffices to say, however, that actuation of the third lever 94 serves to open the defroster opening 86 and permits heated air to be directed from the opening 86 to the windshield. With this defroster opening closed by means of the damper, all the air from the manifold 40 may be directed into the passenger compartment by way of a nozzle 98 (FIGURE 2) and/or other openings placed in the manifold as needed for proper air distribution.

Fixed to the upper top wall of the housing 24 is a valve 100. This valve is provided with an inlet fitting 102 and an outlet fitting 104. It also has an apertured plate (not shown) therein controlling the discharge of the inlet fitting 102 into the valve casing. This apertured plate may be operated by a crank arm 106. The free end of the crank arm bears a pin 108 (FIGURE 5) and this is connected to the pin 62 of the damper crank 60 by means of a rigid link 110. Further details regarding the valve 100 are not given herein as other forms of valves could be used insofar as the present invention is concerned. The specific valve disclosed in the drawings, however, is disclosed in United States patent application Serial No. 36,806, filed June 17, 1960, in the names of Irving M. Schultz and James W. Torriere.

The inlet fitting 102 of the valve 100 is connected by means of a hose 112 to the engine coolant system for the reception of heat. The valve discharge fitting 104 is connected by means of a hose 114 to the conduit 46 entering one leg of the heat exchanger core 42. Another hose 116 connects the outlet conduit 50 of the heat exchanger core as a return line to the engine cooling system.

With the linkage of the valve 100 and the damper 54 the arrangement is such that with the damper closing off the direct passage of air through the housing 24 to the core 42, the valve 100, however, is so arranged that with a slight opening of the damper 54 from its position shown in the drawings, the passage for engine coolant to the heater core will be fully opened—i.e.—in any position of the damper 54 other than shown in FIGURE 4 or FIGURE 5, the water valve 104 will be substantially fully open.

In the event cold weather is being experienced and much heat is required in the passenger compartment, the damper 54 and the valve 100 are simultaneously actuated as a unit by the Bowden wire 78 so that the by-pass arrangement is fully closed by the damper and the water valve 100 is fully opened. Under these conditions where the damper 54 is in one extreme position, discharge of outside air from the blower will be through the core 42 with a maximum heating effect. This heated air will not be diluted or reduced in temperature by any air by-passing the core 42.

If ventilation only is required, the damper 54 will be placed in its closed or other extreme position and as positioned in FIGURES 4 and 5. Simultaneously with this placement of the damper, the valve 100 will be closed and no heat will be conveyed to the core 42. As a result, outside air discharged by the blower will be directed through the by-pass arrangement and be substantially unaffected by the core 42 on its way to the passenger compartment.

When it is desired to regulate the temperature of the passenger compartment with controlled heating then the damper 54 is placed in an intermediate position with the result that the valve 100 will be open for the heating of the core 42. Some outside air will pass through the by-pass arrangement and, being unheated, will serve as a temperature modulator in mixing with air which is heated in going through the heater core. The proportion of the air going through the heater core to the air passing around the heater core obviously determines the temperature of the mixed air ultimately discharged into the passenger compartment—i.e.—the unit operation of the damper 54 and the valve 100 may be such as to secure a desired temperature in the passenger compartment. The temperature control is effected to a large extent by the damper 54 but closure of the valve 100 is necessary for ventilation only thereby making the operational connection important.

It will be appreciated that the blower discharge damper 66 is opened for either heating or ventilating and that it is closed only when it be desirable to close off all discharge of air by the heating system duct work to the passenger compartment.

I claim:

A heating system in an automobile having a passenger compartment partially defined by a fire wall having a main opening, said system comprising a flat heat exchange core traversing said main opening, a blower mounted adjacent to said fire wall, a valve arranged to control the flow of engine coolant through said core, an elongated duct work extending from said blower and along both sides of said fire wall and enclosing said flat core and arranged to conduct air from said flat core to said passenger compartment, a passage in said duct work for conducting air from said blower through said fire wall and to said compartment bypassing said flat core, a valve for controlling the flow of engine coolant through said flat core, a single damper arranged to divide the flow of air from said blower to said flat core and bypass means, and unitary means for controlling said valve and damper whereby air and engine coolant may simultaneously be passed through said flat core in heat exchange relation and the temperature of air downstream from said flat core and upstream from said passenger compartment may be determined by the proportion of air passed through said flat core to the air conducted through said passage.

References Cited in the file of this patent

UNITED STATES PATENTS

| | | |
|---|---|---|
| 2,264,848 | Kahl | Dec. 2, 1941 |
| 2,445,392 | Findley | July 20, 1948 |
| 2,631,517 | Duhn | Mar. 17, 1953 |
| 2,634,670 | Simons | Apr. 14, 1953 |
| 2,876,998 | Csabi | Mar. 10, 1959 |

FOREIGN PATENTS

| | | |
|---|---|---|
| 1,213,582 | France | Nov. 2, 1959 |

UNITED STATES PATENT OFFICE
CERTIFICATE OF CORRECTION

Patent No. 3,084,866                      April 9, 1963

Earl E. Keightley

It is hereby certified that error appears in the above numbered patent requiring correction and that the said Letters Patent should read as corrected below.

Column 3, line 26, for "core 42, the valve 100, however, is so arranged that with" read -- core 42, the valve 100 will also be closed to the passage of engine coolant to the core 42. The valve 100, however, is so arranged that with --.

Signed and sealed this 12th day of November 1963.

SEAL)
Attest:

ERNEST W. SWIDER                          EDWIN L. REYNOLDS

Attesting Officer                      Acting Commissioner of Patents